US012661912B2

(12) United States Patent
Tanaka

(10) Patent No.: US 12,661,912 B2
(45) Date of Patent: Jun. 23, 2026

(54) IMAGE FORMING APPARATUS

(71) Applicant: Toshiba Tec Kabushiki Kaisha, Tokyo (JP)

(72) Inventor: Norio Tanaka, Numazu Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 101 days.

(21) Appl. No.: 18/739,253

(22) Filed: Jun. 10, 2024

(65) Prior Publication Data

US 2025/0115062 A1 Apr. 10, 2025

(30) Foreign Application Priority Data

Oct. 5, 2023 (JP) ................................ 2023-173478

(51) Int. Cl.

*B41J 13/00* (2006.01)
*B41J 2/325* (2006.01)
*B41J 3/407* (2006.01)
*B41J 11/04* (2006.01)
*B41J 25/308* (2006.01)

(52) U.S. Cl.

CPC ........... *B41J 13/0027* (2013.01); *B41J 2/325* (2013.01); *B41J 3/4075* (2013.01); *B41J 11/04* (2013.01); *B41J 25/308* (2013.01)

(58) Field of Classification Search

CPC ...... B41J 13/0027; B41J 2/325; B41J 3/4075; B41J 11/04; B41J 25/308; B41J 2/355

See application file for complete search history.

(56) References Cited

U.S. PATENT DOCUMENTS 9,061,519 B2 6/2015 Matsuda
2020/0130371 A1 * 4/2020 Fujita ...................... B41J 35/08

FOREIGN PATENT DOCUMENTS

JP H05-050729 A 3/1993

OTHER PUBLICATIONS

Non-U.S. Patent Document (Not English), JP, Mar. 2, 1993, 5-50729(A), Yuji Yasui, Fig 2, 4-5, Paragraph[0003]-[0007][0043], (Explanation of the relevance).

* cited by examiner

*Primary Examiner* — Lisa Solomon
(74) *Attorney, Agent, or Firm* — Kim & Stewart LLP

(57) ABSTRACT

An image forming apparatus includes a head configured to transfer ink from an ink ribbon to a print medium, a roller for pressing the print medium, and a controller configured to: upon receipt of print data, determine image areas in which an image is formed and non-image areas in which no image is formed, at the beginning of printing, control a distance between the head and the roller such that they contact each other, and set conveyance speeds of the medium and the ribbon to first and second values, before a boundary between the image and non-image areas reaches a position at which the head contacts the roller, set the speeds to third and fourth values lower than the first and second values, and when the boundary reaches the position, control the distance such that the head and the roller are separated from each other.

20 Claims, 5 Drawing Sheets

IMAGE FORMING APPARATUS

CROSS-REFERENCE TO RELATED APPLICATION(S)

This application is based upon and claims the benefit of priority from Japanese Patent Application No. 2023-173478, filed Oct. 5, 2023, the entire contents of which are incorporated herein by reference.

FIELD

Embodiments described herein relate generally to an image forming apparatus.

BACKGROUND

There are conventional image forming apparatuses in which ink is transferred from an ink ribbon to a label by a thermal head to form an image on the label.

In such an image forming apparatus, when there is an area (hereinafter referred to as a non-image area) on the label in which no image is formed in the conveyance direction of the label, the ink ribbon is conveyed without being used during a period in which the non-image area passes between the ink ribbon and the platen. To deal with such a situation, there is known a method of separating the ink ribbon from the label by moving the thermal head away from the platen and temporarily stopping the conveyance of the ink ribbon during the period. However, in such a method, as the conveyance speed of the label increases, the period in which the non-image area passes between the ink ribbon and the platen becomes shorter. For this reason, as the conveyance speed of the label increases, it may be difficult to perform separation of the ink ribbon from the label and stop conveyance of the ink ribbon. This leads to a reduction in the efficiency of use of the ink ribbon, which is undesirable.

SUMMARY OF THE INVENTION

Embodiments of the present disclosure provide an image forming apparatus capable of increasing the use efficiency of an ink ribbon.

An image forming apparatus in one embodiment comprises a head configured to transfer ink from an ink ribbon to a print medium; a roller for pressing the print medium against the head; and a controller configured to control a conveyance speed of the print medium, a conveyance speed of the ink ribbon, and a distance between the head and the roller. The controller is configured to: upon receipt of print data, determine, along a conveyance direction of the print medium, one or more image areas in which an image is formed on the print medium and one or more non-image areas in which no image is formed on the print medium, at the beginning of printing, control the distance between the head and the roller such that the head and the roller contact each other, and set the conveyance speed of the print medium to a first value and the conveyance speed of the ink ribbon to a second value, before a first boundary between a first image area and a first non-image area that follows the first image area reaches a print position at which the head and the roller contact each other, set the conveyance speed of the print medium to a third value and the conveyance speed of the ink ribbon to a fourth value, the third value being lower than the first value and the fourth value being lower than the second value, and when the first boundary reaches the print position, control the distance between the head and the roller such that the head and the roller are separated from each other.

DETAILED DESCRIPTION

Figure 1:
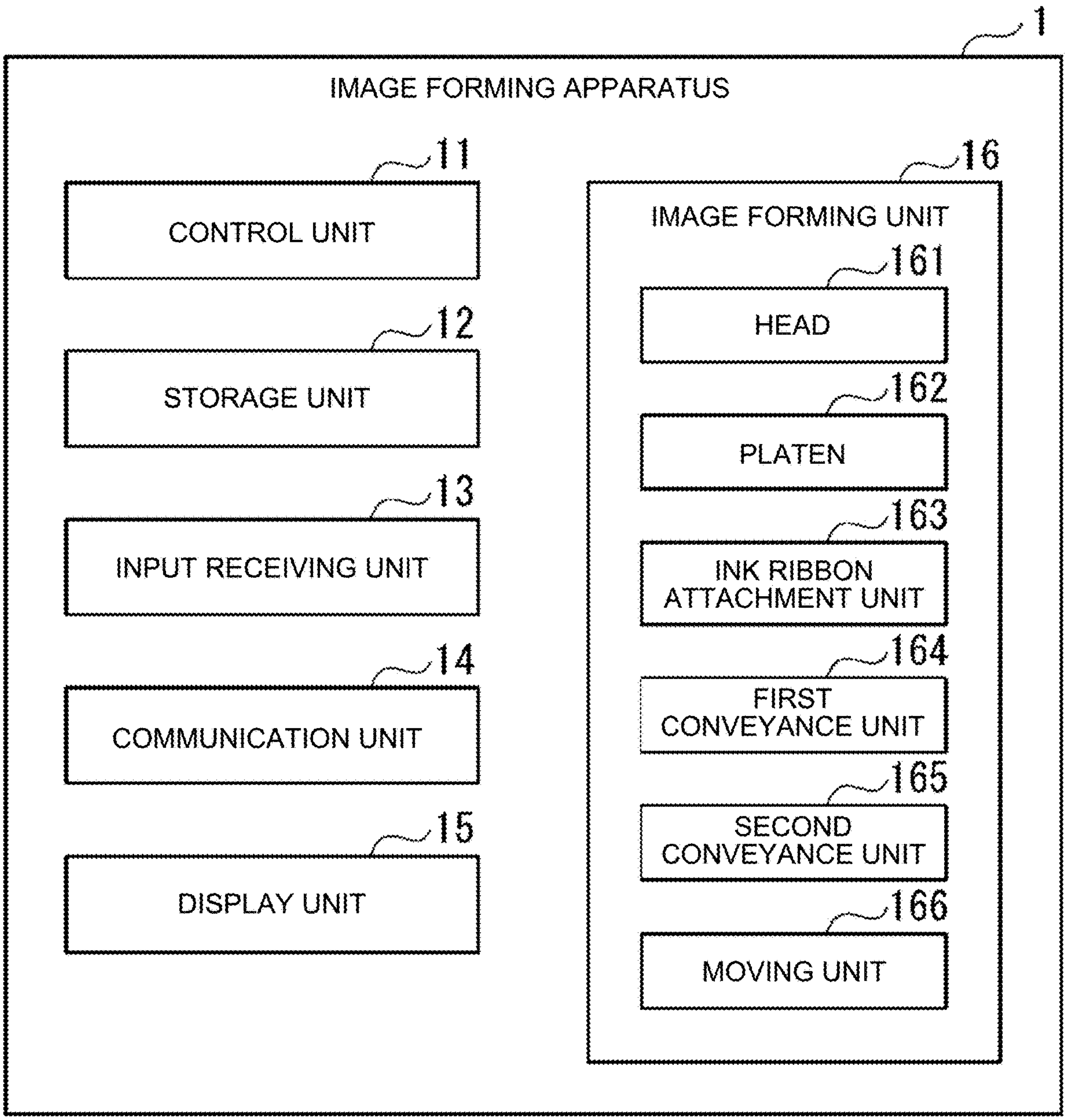
FIG. 1 is a diagram illustrating a configuration of an image forming apparatus according to an embodiment.

An image forming apparatus 1 according to an embodiment will be described with reference to the drawings. In the drawings, the same components are denoted by the same reference numerals.

(Configuration of Image Forming Apparatus)

FIG. 1 is a diagram illustrating a configuration of an image forming apparatus 1.

The image forming apparatus 1 forms an image on a print medium using an ink ribbon. For example, the image forming apparatus 1 is a thermal printer. Instead of the thermal printer, the image forming apparatus 1 may be another printer that forms an image on a print medium using an ink ribbon, such as a dot printer.

The print medium is a medium to be processed by the image forming apparatus 1 such as an image formation process. The print medium may be any sheet-like medium on which an image can be formed on a surface thereof. For example, the print medium may be, but is not limited to, a label, a seal mount, a printing paper, a plastic film, etc.

The image forming apparatus 1 includes, for example, a control unit 11, a storage unit 12, an input receiving unit 13, a communication unit 14, a display unit 15, and an image forming unit 16.

The control unit 11 is a controller for controlling the operation of the image forming apparatus 1. The control unit 11 includes a processor such as a central processing unit (CPU) and a field programmable gate array (FPGA). The control unit 11 executes various programs stored in the storage unit 12.

The storage unit 12 is a storage device including, for example, a solid state drive (SSD), a hard disk drive (HDD), an electrically erasable programmable read only memory (EEPROM), a read only memory (ROM), a random access memory (RAM), and the like. The storage unit 12 may be an external storage device connected by a digital input/output port such as a universal serial bus (USB) instead of the one incorporated in the image forming apparatus 1. The storage unit 12 stores various kinds of information processed by the image forming apparatus 1, various kinds of programs, and the like.

The input receiving unit 13 is an input device including a button, a hardware key such as a lever, a touch pad, and the like. The input receiving unit 13 may be configured integrally with the display unit 15 as a touch panel.

The communication unit 14 is configured to include, for example, a digital input/output port such as a USB and a network interface circuit such as an Ethernet port, an antenna for radio communication, and the like.

The display unit 15 is a display device including, for example, a liquid crystal display panel or an organic electro luminescence (EL) display panel as a display included in the image forming apparatus 1.

The image forming unit 16 forms an image on a print medium under the control of the control unit 11. The image forming unit 16 includes, for example, a head 161, a platen 162, an ink ribbon attachment unit 163, a first conveyance unit 164, a second conveyance unit 165, and a moving unit 166. In addition to the head 161, the platen 162, the ink ribbon attachment unit 163, the first conveyance unit 164, the second conveyance unit 165, and the moving unit 166, the image forming unit 16 may include other components or devices.

The head 161 forms an image on the print medium conveyed by the first conveyance unit 164 using the ink ribbon attached to the ink ribbon attachment unit 163. As described above, in an embodiment, the image forming apparatus 1 is a thermal printer. In this case, the head 161 heats the ink ribbon to form an image on the print medium.

The platen 162 is a member that faces the head 161. The platen 162 is, for example, a platen roller, but is not limited thereto. More specifically, the platen 162 is a member that presses the print medium against an ink ribbon that slidably abuts the head 161. Therefore, the ink ribbon drawn out from the ink ribbon cartridge containing the ink ribbon passes between the head 161 and the platen 162 and is stored in the cartridge again. The print medium conveyed by the first conveyance unit 164 is thus conveyed so as to pass between the ink ribbon positioned between the head 161 and the platen 162 and the platen 162.

The ink ribbon attachment unit 163 is a member to which the above-described ink cartridge is attached.

The first conveyance unit 164 conveys the print medium at a first conveyance speed. The first conveyance speed may be any speed for conveying the print medium. The first conveyance unit 164 may change the conveyance speed of the print medium to a speed different from the first conveyance speed under the control of the control unit 11.

The second conveyance unit 165 conveys the ink ribbon at a second conveyance speed so that the ink ribbon drawn out from the ink ribbon cartridge attached to the ink ribbon attachment unit 163 is again accommodated in the ink ribbon cartridge. In the case where the image forming apparatus 1 forms an image on a print medium, the second conveyance speed may be any speed for conveying the ink ribbon. However, the second conveyance speed is determined in accordance with the first conveyance speed so as not to cause deflection of the ink ribbon or the like in the conveyance of the print medium by the first conveyance unit 164. The second conveyance unit 165 may change the conveyance speed of the ink ribbon to a speed different from the second conveyance speed under the control of the control unit 11. However, the second conveyance unit 165 changes the conveyance speed of the ink ribbon so that the conveyance speed of the ink ribbon is proportional to the conveyance speed of the print medium. This is to prevent deflection of the ink ribbon or the like from occurring in the conveyance of the print medium by the first conveyance unit 164.

The moving unit 166 moves the relative position between the head 161 and the platen 162 between a first position that presses the ink ribbon against the print medium and a second position that does not press the ink ribbon against the print medium. For example, the moving unit 166 includes a moving mechanism that moves the head 161 between the first position and the second position and adjust the distance between the head 161 and the platen 162. For convenience of explanation, the relative position will be referred to as the position of the head 161.

Figure 2:
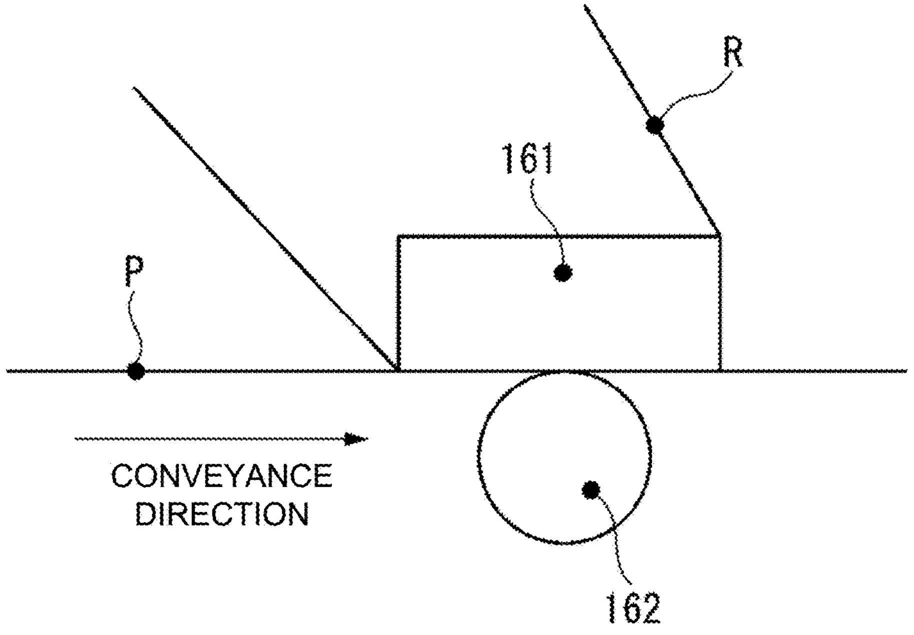
FIG. 2 is a diagram illustrating a head at a first position.

FIG. 2 is a diagram illustrating the head 161 located at the first position. In the example illustrated in FIG. 2, an ink ribbon cartridge in which an ink ribbon R is accommodated is attached to the ink ribbon attachment unit 163. Therefore, in this example, the ink ribbon R is positioned between the head 161 and the platen 162. In FIG. 2, the ink ribbon attachment unit 163 and the ink ribbon cartridge are omitted in order to simplify the drawing. Further, in this example, a print medium P conveyed by the first conveyance unit 164 passes between the ink ribbon R and the platen 162, which are in slidable contact with the head 161. An arrow illustrated in FIG. 2 indicates the conveyance direction of the print medium P.

As shown in FIG. 2, when the position of the head 161 is the first position and the print medium P passes between the ink ribbon R and the platen 162, the ink ribbon R is pressed against the print medium P by the head 161 and the platen 162. Accordingly, the image forming apparatus 1 can accurately form an image on the print medium P by the head 161 using the ink ribbon R.

Figure 3:
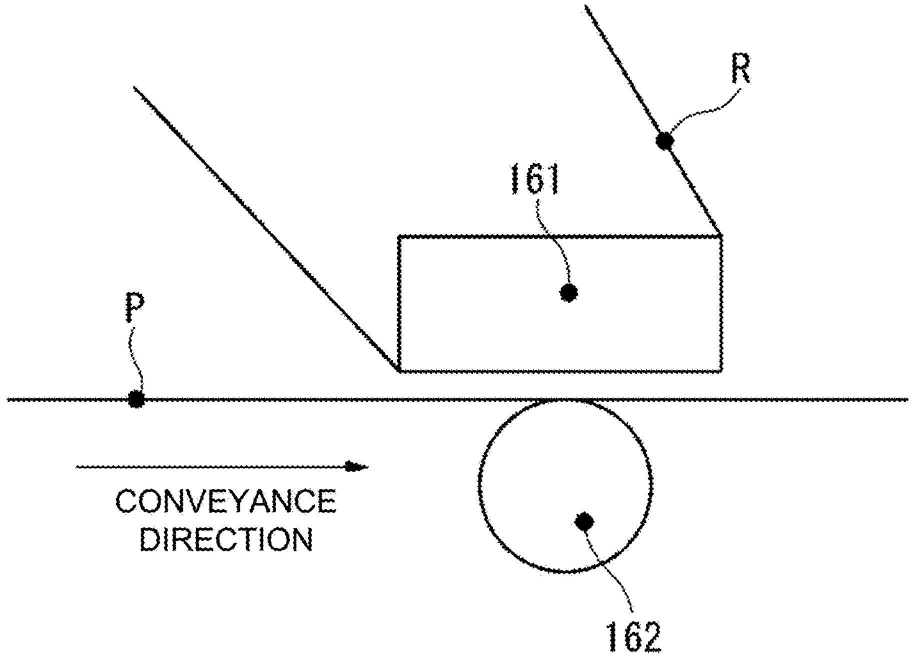
FIG. 3 is a view showing the head moved to a second position.

On the other hand, FIG. 3 is a diagram illustrating the head 161 moved to the second position. Also in FIG. 3, the ink ribbon attachment unit 163 and the ink ribbon cartridge are omitted in order to simplify the drawing.

As shown in FIG. 3, when the position of the head 161 is the second position, even if the print medium P passes between the ink ribbon R and the platen 162, the ink ribbon R is not pressed against the print medium P. This is because, in this case, the head 161 is separated from the platen 162 together with the ink ribbon R, and a gap is formed between the ink ribbon R and the platen 162.

Here, in a conventional thermal printer X different from the image forming apparatus 1, when there is a non-image area in which an image is not formed on the print medium in the conveyance direction of the print medium, the ink ribbon is conveyed without being used during a period in which the non-image area passes between the ink ribbon and the platen. The thermal printer X is capable of separating the thermal head from the print medium as needed. As a method for solving such a problem, there is known a method in which the thermal head is separated from the print medium and the conveyance of the ink ribbon is temporarily stopped in the period. However, in such a method, the faster the conveyance speed of the print medium, the shorter the period in which the non-image area passes between the ink ribbon and the platen.

Figure 4:
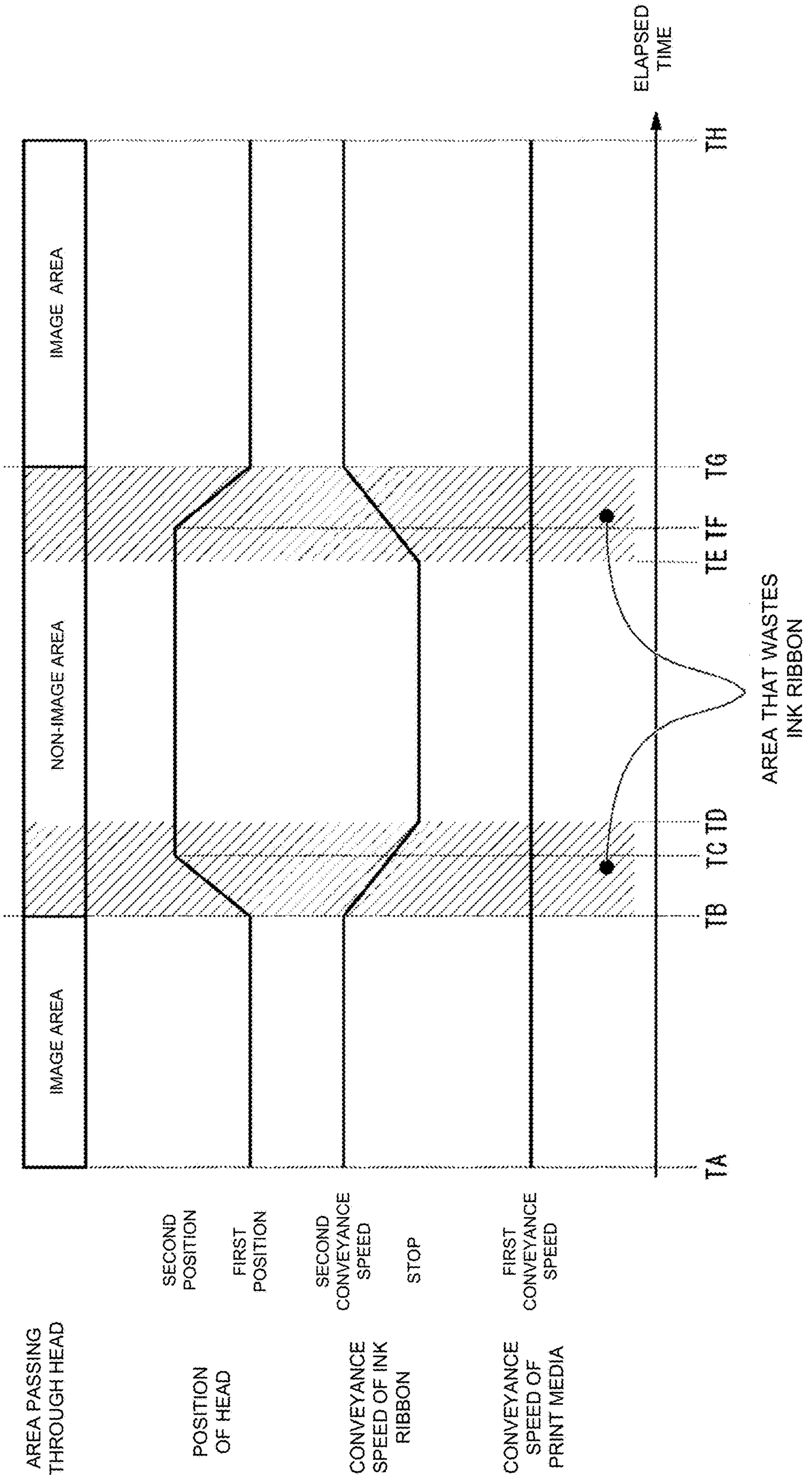
FIG. 4 is a timing diagram of the positions of the head performing the operation performed by a conventional thermal printer.

FIG. 4 is a diagram illustrating the movement of the head 161 when the image forming apparatus 1 performs the same operation as that of the thermal printer X. In FIG. 4, four timing charts having a common horizontal axis are arranged vertically. The common horizontal axis of these four timing charts indicates the elapsed time since one of the areas on the print medium in the conveyance direction begins to pass through the image area located between the head 161 and the platen 162. The image area is an area in which an image is formed on the print medium in the conveyance direction of the print medium.

In FIG. 4, a timing chart indicated by "area passing through head" indicates which of the image area and the non-image area is an area on the print medium passing through the image forming position at each time indicated by the horizontal axis included in the timing chart.

A timing chart indicated by "position of head" in FIG. 4 indicates the position of the head 161 at each time indicated by the horizontal axis included in the timing chart.

In FIG. 4, a timing chart indicated by the "conveyance speed of ink ribbon" indicates the conveyance speed of the ink ribbon by the second conveyance unit 165 at each time indicated by the horizontal axis included in the timing chart.

In FIG. 4, a timing chart indicated by the "conveyance speed of print medium" indicates the conveyance speed of the print medium by the first conveyance unit 164 at each time indicated by the horizontal axis included in the timing chart.

In the example shown in FIG. 4, at the time TA, an image area starts to pass through the image forming position. The area on the print medium passing through the image forming position remains in the image area within the time interval from the time TA to the time TB. In this example, at the time TB, the non-image area which is located upstream of the image area in the conveyance direction and adjoins the image area starts passing through the image forming position. The area on the print medium passing through the image forming position remains in the non-image area within the time interval from the time TB to the time TG. In this example, at the time TG, the non-image area starts to pass through the image area that is upstream of the non-image area in the conveyance direction and is contiguous with the non-image area. The area on the print medium passing through the image forming position remains in the image area within the time interval from the time TG to the time TH.

In the example illustrated in FIG. 4, even when the area on the print medium passing through the image forming position changes in this manner within the period from the time TA to the time TH, the image forming apparatus 1 maintains the conveyance speed of the print medium by the first conveyance unit 164 at the first conveyance speed within the period.

On the other hand, the image forming apparatus 1 holds the head 161 at the first position during a period from the time TA to the time TB, and continues to press the ink ribbon in contact with the head 161 against the print medium. This is because, within this period, the area on the print medium passing through the image forming position is the image area, and the image forming apparatus 1 forms an image on the area on the print medium passing through the image forming position. At the time TB, the image forming apparatus 1 starts to move the position of the head 161 from the first position to the second position. This is because the area on the print medium passing through the image forming position is the non-image area within the time period from the time TB to the time TG. The position of the head 161 that has started to be moved by the image forming apparatus 1 in this way reaches the second position at the time TC. In other words, the image forming apparatus 1 completes the separation of the ink ribbon from the print medium at the time TC. However, the area on the print medium that passes through the image area changes from the non-image area to the imaging area again at time TG. Therefore, the image forming apparatus 1 starts to move the position of the head 161 from the second position to the first position at the time TF. The position of the head 161 that has started to be moved by the image forming apparatus 1 in this way reaches the first position at the time TG. In other words, the image forming apparatus 1 completes the contact of the ink ribbon with the print medium at the time TG. After the time TG, the image forming apparatus 1 maintains the position of the head 161 at the first position within the time period up to the time TH.

In this manner, within the time period in which the head 161 is separated from the print medium, the image forming apparatus 1 starts stopping the conveyance of the ink ribbon at the second conveyance speed by the second conveyance unit 165 at the time TB in order to reduce the conveyance amount of the ink ribbon while the non-image area passes through the image forming position. The stopping of the conveyance of the ink ribbon is completed at the time TD after the time TC. This is because the second conveyance unit 165 cannot instantaneously complete the conveyance of the ink ribbon. After the time TD, the image forming apparatus 1 starts to restart the conveyance of the ink ribbon stopped in this manner at the time TE. That is, the image forming apparatus 1 starts to increase the conveyance speed of the ink ribbon by the second conveyance unit 165 to the second conveyance speed at the time TE. This increase in the conveyance speed of the ink ribbon is completed at the time TG. This is also because the second conveyance unit 165 cannot instantaneously complete the conveyance of the ink ribbon.

Each of the period from the time TC to the time TD and the period from the time TE to the time TG is a period in which the ink ribbon is conveyed without being used. Therefore, the longer the two periods, the lower the efficiency of use of the ink ribbon in the image forming apparatus 1. In addition, when the time for the non-image area to pass through the image forming position is shorter than the sum of the two periods, the image forming apparatus 1 cannot resume the conveyance thereafter even if the conveyance of the ink ribbon can be stopped within the time. This means that as the conveyance speed of the print medium increases, it becomes difficult for the image forming apparatus 1 to perform separation of the ink ribbon from the print medium and stop conveyance of the ink ribbon. This leads to a reduction in the efficiency of use of the ink ribbon, which is undesirable.

Therefore, in the image forming apparatus 1 having the above-described configuration, when the position of the leading end in the conveyance direction of the non-image area passes through the third position located upstream of the image forming position on the conveyance path of the print medium, the ink ribbon waste suppression process described below is performed. That is, the image forming apparatus 1 reduces the conveyance speed of the print medium by the first conveyance unit 164 to a third conveyance speed that is slower than the first conveyance speed, and reduces the conveyance speed of the ink ribbon by the second conveyance unit 165 to a fourth conveyance speed that is slower than the second conveyance speed. Then, the image forming apparatus 1 starts to reduce the conveyance speed of the print medium by the first conveyance unit 164 to the third conveyance speed, and then moves the position of the head 161 from the first position to the second position by the moving unit 166 in the non-image area. Accordingly, the image forming apparatus 1 can shorten the time required for stopping the conveyance of the ink ribbon in the non-image area while increasing the first conveyance speed. As a result, even if the first conveyance speed is increased, the image forming apparatus 1 can easily separate the ink ribbon from the print medium in the non-image area and reduce the conveyance speed of the ink ribbon, thereby reducing the conveyance amount of the ink ribbon in the non-image area.

That is, the image forming apparatus 1 can more reliably suppress a deterioration in the use efficiency of the ink ribbon.

Figure 5:
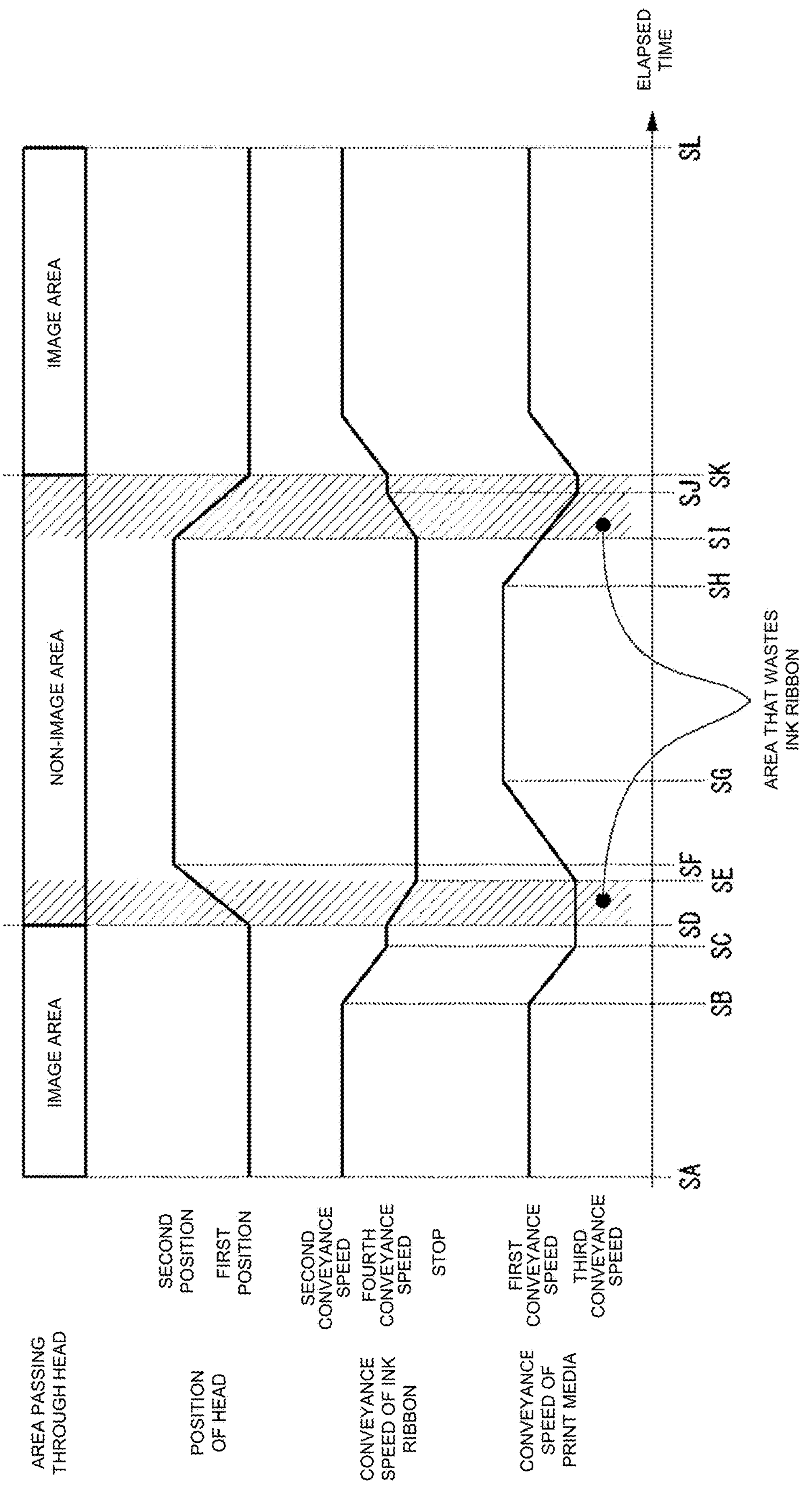
FIG. 5 is a timing diagram of the positions of the head performing an ink ribbon waste suppression process according to an embodiment.

FIG. 5 is a diagram illustrating the movement of the head 161 when the image forming apparatus 1 performs the ink ribbon waste suppression process. In FIG. 5, four timing charts having a common horizontal axis are arranged vertically. The common horizontal axis of these four timing charts indicates the elapsed time since a certain imaging area began to pass through the image area.

In FIG. 5, a timing chart indicated by "area passing through head" indicates which of the image area and the non-image area is an area on the print medium passing through the image forming position at each time indicated by the horizontal axis included in the timing chart.

A timing chart indicated by "position of head" in FIG. 5 indicates the position of the head 161 at each time indicated by the horizontal axis included in the timing chart.

In FIG. 5, a timing chart indicated by the "conveyance speed of ink ribbon" indicates the conveyance speed of the ink ribbon by the second conveyance unit 165 at each time indicated by the horizontal axis included in the timing chart.

In FIG. 5, a timing chart indicated by the "conveyance speed of print medium" indicates the conveyance speed of the print medium by the first conveyance unit 164 at each time indicated by the horizontal axis included in the timing chart.

In the embodiment shown in FIG. 5, at time SA, an image area has started to pass through the image forming position. The area on the print medium passing through the image forming position remains in the image area within the time interval from the time SA to the time SD. In this example, at the time SD, the non-image area which is located upstream of the image area in the conveyance direction and adjoins the image area starts passing through the image forming position. The area on the print medium passing through the image forming position remains in the non-image area within the time interval from the time SD to the time SK. In this example, at the time SK, the non-image area starts to pass through the image area that is upstream of the non-image area in the conveyance direction and is contiguous with the non-image area. The area on the print medium passing through the image forming position remains in the image area within the time interval from the time SK to the time SL.

When the area on the print medium passing through the image forming position changes in this way within the period from the time SA to the time SL, the image forming apparatus 1 changes each of the conveyance speed of the print medium by the first conveyance unit 164 and the conveyance speed of the ink ribbon by the second conveyance unit 165, and changes the position of the head 161.

Specifically, at the time SB, the image forming apparatus 1 starts to reduce the conveyance speed of the print medium by the first conveyance unit 164 from the first conveyance speed to the third conveyance speed, and also starts to reduce the conveyance speed of the ink ribbon by the second conveyance unit 165 from the second conveyance speed to the fourth conveyance speed. The time SB is a time at which the position of the end of the non-image area in the conveyance direction passes through the third position. The third position is a position determined in advance as a position at which the reduction of the conveyance speed to the third conveyance speed is completed before the non-image area starts to pass through the image forming position. The third conveyance speed may be any speed as long as the speed is slower than the first conveyance speed. The fourth conveyance speed may be any speed as long as the fourth conveyance speed is a speed slower than the second conveyance speed and does not destroy a proportional relationship with the conveyance speed of the print medium. The reduction in the conveyance speed of the print medium and the reduction in the conveyance speed of the ink ribbon are completed at the time SC. The third position may be a position determined in advance as a position at which the reduction of the conveyance speed to the third conveyance speed is completed at a time when the non-image area starts to pass through the image forming position. Here, the time SC coincides with the time SD. Therefore, in this case, the image forming apparatus 1 can suppress a decrease in the use efficiency of the ink ribbon and also suppress a decrease in the throughput for the formation of an image on the print medium. The image forming apparatus 1 holds the conveyance speed of the print medium by the first conveyance unit 164 and the conveyance speed of the ink ribbon by the second conveyance unit 165 in a time period from the time SC to the time SD without changing them.

On the other hand, the image forming apparatus 1 holds the position of the head 161 at the first position within the time from the time SB to the time SD, thereby holding the ink ribbon pressed against the print medium. This is because the area on the print medium passing through the image forming position remains as the image area within the time period from the time SB to the time SD.

The image forming apparatus 1 starts to move the position of the head 161 held in this manner to the second position SD the time when the position of the front end of the non-image area in the conveyance direction starts to pass through the image forming position. This moving of the head 161 is completed at the time SF. On the other hand, the image forming apparatus 1 starts stopping the conveyance of the ink ribbon by the second conveyance unit 165 at the time SD. The stopping of the conveyance of the ink ribbon is completed at a time SE earlier than the time SF. This is because the second conveyance unit 165 cannot instantaneously complete the conveyance of the ink ribbon, and the head 161 is separated from the print medium at the time SE. Accordingly, the image forming apparatus 1 can more reliably suppress the use efficiency of the ink ribbon from decreasing. The image forming apparatus 1 may be configured so as not to start stopping the conveyance of the ink ribbon by the second conveyance unit 165 at the time SD. In this case, the image forming apparatus 1 maintains the conveyance speed of the ink ribbon by the second conveyance unit 165 at the fourth conveyance speed within the period from the time SC to the time SK. Even in this case, the image forming apparatus 1 can more reliably suppress the use efficiency of the ink ribbon from being lowered as compared with a case where the conveyance speed is held at the second conveyance speed within the period.

The image forming apparatus 1 starts to increase the conveyance speed of the print medium by the first conveyance unit 164 to the fifth conveyance speed equal to or higher than the first conveyance speed at the time SE when the conveyance of the ink ribbon is stopped. In the example illustrated in FIG. 5, the fifth conveyance speed is a conveyance speed equal to or higher than the first conveyance speed. In this case, the increase in the conveyance speed of the print medium is completed at the time SG. Due to the increase in the conveyance speed of the print medium, the image forming apparatus 1 can more reliably suppress the decrease in the throughput for the formation of an image on the print medium while suppressing the deterioration in the use efficiency of the ink ribbon. The image forming apparatus 1 may be configured not to increase the conveyance speed of the print medium by the first conveyance unit 164 to the fifth conveyance speed equal to or higher than the first conveyance speed at the time SE. The image forming apparatus 1 retains the third conveyance speed within a time period from the time SD to the time SK.

The image forming apparatus 1 reduces the conveyance speed of the print medium raised in this manner to the third conveyance speed SH the time at which the position of the leading end in the conveyance direction of the non-image area starts to pass through the conveyance speed lowering position. The conveyance speed lowering position is a position determined in advance as a position at which the lowering of the conveyance speed to the third conveyance speed is completed SJ the time at which the raising of the conveyance speed of the ink ribbon to the fourth conveyance speed is completed, as will be described later. At the time SH, the image forming apparatus 1 holds the ink ribbon while stopping the conveyance. This is because, at the time SH, the area on the print medium passing through the image forming position remains the non-image area.

After the time SH, the image forming apparatus 1 starts to increase the conveyance speed of the ink ribbon to the fourth conveyance speed at the time SI, and starts to move the position of the head 161 from the second position to the first position. The time SI is a time at which the position of the front end of the non-image area in the conveyance direction starts to pass through the fourth position. The fourth position is a position determined in advance as a position at which the increase of the conveyance speed to the fourth conveyance speed is completed before the image area starts to pass through the image forming position. The movement of the head 161 started at the time SI is completed at the time SK. The increase in the conveyance speed of the ink ribbon started at the time SI is completed at the time SJ. This is because the second conveyance unit 165 cannot instantaneously complete the conveyance of the ink ribbon, and because the time SK is the time at which the image area starts to pass through the image forming position. The fourth position may be a position determined in advance as a position at which the increase of the conveyance speed to the fourth conveyance speed is completed at a time when the image area starts to pass through the image forming position. Here, the time SI coincides with the time SK.

At time SK, the image forming apparatus 1 starts to increase the conveyance speed of the ink ribbon to the second conveyance speed and also starts to increase the conveyance speed of the print medium to the first conveyance speed.

Each of the period from the time SD to the time SE and the period from the time SI to the time SK is a period in which the ink ribbon is conveyed without being used. Comparing FIG. 4 with FIG. 5, it can be seen that the period in which the ink ribbon is conveyed without being used is shorter in the period shown in FIG. 5. This is because the change width of the conveyance speed of the ink ribbon in the non-image area is narrower from 0 to the fourth conveyance speed than from 0 to the second conveyance speed. Therefore, the image forming apparatus 1 can shorten the time required for stopping the conveyance of the ink ribbon in the non-image area and the time required for resuming the conveyance in the non-image area while increasing the first conveyance speed by the ink ribbon waste suppression process. As a result, even if the first conveyance speed is increased, the image forming apparatus 1 can easily separate the ink ribbon from the print medium in the non-image area and reduce the conveyance speed of the ink ribbon, thereby reducing the conveyance amount of the ink ribbon in the non-image area. That is, the image forming apparatus 1 can more reliably suppress lowering of the use efficiency of the ink ribbon.

As described above, the image forming apparatus 1 changes the conveyance speed of the ink ribbon, the conveyance speed of the print medium, and the position of the head 161 in the ink ribbon waste suppression process. Accordingly, the image forming apparatus 1 can more reliably suppress the use efficiency of the ink ribbon from decreasing.

(Ink Ribbon Waste Suppression Process)

Figure 6:
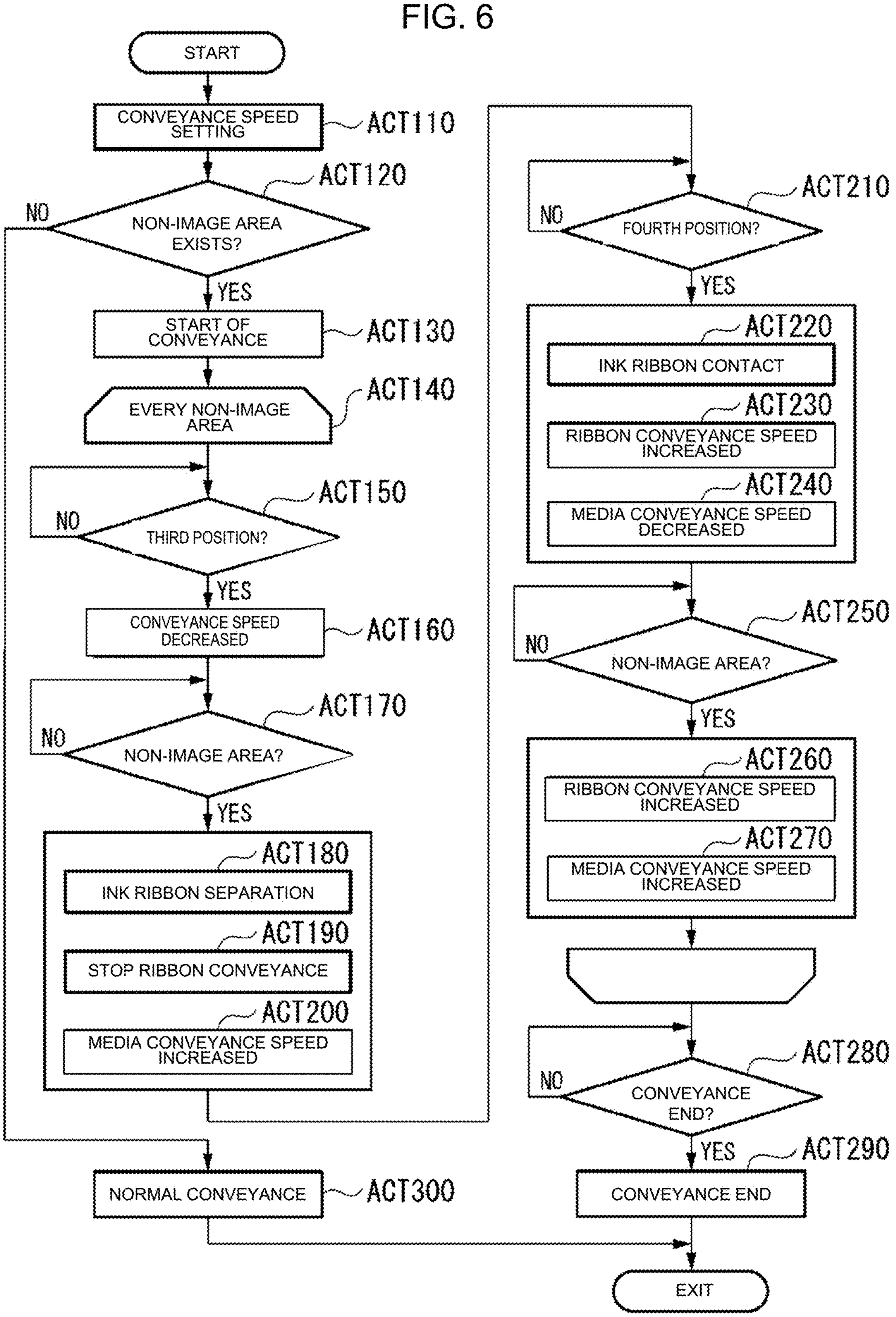
FIG. 6 is a flowchart of the ink ribbon waste suppression process.

FIG. 6 is a diagram illustrating a flow of an ink ribbon waste suppression process. As an example, a case where the image forming apparatus 1 has received print data at a timing earlier than ACT110 illustrated in FIG. 6 is performed will be described. However, in FIG. 6, the description of the process of causing the image forming unit 16 to form an image on the print medium is omitted. That is, the process illustrated in FIG. 6 is related to the conveyance of the print medium when the image forming apparatus 1 forms an image on the print medium. As an example, a case where the position of the head 161 is the first position at the timing will be described.

After receiving the print data, the control unit 11 sets the first conveyance speed to the first conveyance unit 164 as the conveyance speed of the print medium when forming an image on the print medium, and sets the second conveyance speed to the second conveyance unit 165 as the conveyance speed of the ink ribbon in this case (ACT110). In FIG. 6, the process of ACT110 is indicated as "conveyance speed setting".

Next, the control unit 11 determines whether one or more non-image areas having a predetermined length or longer in the conveyance direction are included in the area on the print medium on which the image is to be formed, based on the print data received in advance (ACT120). In FIG. 6, the process of ACT120 is indicated by "non-image area exists?". The control unit 11 can determine whether one or more non-image areas having the predetermined length or longer are included using any known method.

When the control unit 11 determines that one or more non-image areas having the predetermined length or longer in the conveyance direction are not included in the area on the print medium on which an image is to be formed (ACT120, NO), the control unit performs conveyance of the print medium by the first conveyance unit 164 and conveyance of the ink ribbon by the second conveyance unit 165 (ACT300). In FIG. 6, the process of ACT300 is indicated as "normal conveyance". After ACT300 process is performed, the control unit 11 ends the process of the flow chart shown in FIG. 6.

On the other hand, when it is determined that one or more non-image areas having a predetermined length or more in the conveyance direction are included in the area on the print medium on which an image is formed (ACT120, YES), the control unit 11 starts conveying the print medium by the first conveyance unit 164 and conveying the ink ribbon by the second conveyance unit 165 (ACT130).

Next, the control unit 11 selects one or more non-image areas included in the area on the print medium on which the image is to be formed, one by one, from the downstream side in the conveyance direction, as the target non-image area, and repeats ACT150 through ACT270 processes for each selected target non-image area (ACT140). In FIG. 6, the process of ACT140 is indicated as "every non-image area".

The control unit 11 waits until the position of the end of the target non-image area selected in ACT140 in the conveyance direction reaches the above-described third position (ACT150). In FIG. 6, the process of ACT150 is indicated as "third position". The control unit 11 can determine whether the position of the tip has reached the third position using any known method.

When it is determined that the position of the leading end in the conveyance direction of the target non-image area selected in ACT140 has reached the third position (ACT150, YES), the control unit 11 sets the third conveyance speed to the first conveyance unit 164 as the conveyance speed of the print medium, and sets the fourth conveyance speed to the second conveyance unit 165 as the conveyance speed of the ink ribbon. Thus, the control unit 11 decreases the conveyance speed of the print medium from the first conveyance speed to the third conveyance speed, and decreases the conveyance speed of the ink ribbon from the second conveyance speed to the fourth conveyance speed (ACT160). In FIG. 6, the process of ACT160 is indicated as "conveyance speed decreased". The control unit 11 completes the decrease of the conveyance velocity in ACT160 until the position of the leading edge of the target non-image area selected in ACT140 reaches the image forming position.

Next, the control unit 11 waits until the position of the end of the target non-image area selected in ACT140 in the conveyance direction reaches the image forming position (ACT170). The control unit 11 can determine whether the position of the tip has reached the image forming position using any known method.

When the control unit 11 determines that the position of the leading end of the target non-image area selected in ACT140 in the conveyance direction has reached the image forming position (ACT170, YES), ACT180 through ACT200 are performed in parallel. ACT180 through ACT200 may be performed in a predetermined order.

In ACT180, the control unit 11 controls the moving unit 166 to move the position of the head 161 from the first position to the second position, thereby separating the ink ribbon from the print medium (ACT180). In FIG. 6, the process of ACT180 is indicated as "ink ribbon separation".

In ACT190, the control unit 11 controls the second conveyance unit 165 to ACT190 the conveyance of the ink ribbon (ACT190). In FIG. 6, the process of ACT190 is indicated as "stop ribbon conveyance".

In ACT200, the control unit 11 sets the fifth conveyance speed to the first conveyance unit 164 as the conveyance speed of the print medium, thereby raising the conveyance speed of the print medium to the fifth conveyance speed (ACT200). In FIG. 6, the process of ACT200 is indicated as "medium conveyance speed increased". However, it is preferable that the control unit 11 starts ACT200 process after ACT190 process is performed. This is to more reliably prevent the ink ribbon from being deflected as the conveyance speed of the print medium increases.

After ACT180 through ACT200 are performed, the control unit 11 waits until the position of the leading end of the non-target image area selected in ACT140 in the conveyance direction reaches the above-described fourth position (ACT210). In FIG. 6, the process of ACT210 is indicated as "fourth position?". The control unit 11 can determine whether the position of the tip has reached the fourth position using a known method.

When the control unit 11 determines that the position of the end of the target non-image area selected in ACT140 in the conveyance direction has reached the fourth position (ACT210, YES), ACT220 through ACT240 are performed in parallel. ACT220 through ACT240 may be performed in a predetermined order.

In ACT220, the control unit 11 controls the moving unit 166 to move the position of the head 161 from the second position to the first position, thereby bringing the ink ribbon into contact with the print medium (ACT220). In FIG. 6, the process of ACT220 is indicated by "ink ribbon contact".

In ACT230, the control unit 11 controls the second conveyance unit 165 to set the fourth conveyance speed to the second conveyance unit 165 as the conveyance speed of the ink ribbon, thereby raising the conveyance speed of the ink ribbon to the fourth conveyance speed (ACT230). In FIG. 6, the process of ACT230 is indicated as "ribbon conveyance speed increased".

In ACT240, the control unit 11 sets the third conveyance speed to the first conveyance unit 164 as the conveyance speed of the print medium, thereby reducing the conveyance speed of the print medium to the third conveyance speed (ACT240). In FIG. 6, the process of ACT240 is indicated as "media conveyance speed decreased".

After ACT220 through-ACT240 are performed, the control unit 11 waits until the position of the leading end of the image area located after the target non-image area selected in ACT140 reaches the image forming position in the conveyance direction (ACT250). In FIG. 6, the process of ACT250 is indicated as "non-image area?". The image area located after the target non-image area selected in ACT140 is an image area located upstream of the target non-image area in the conveyance direction, and is an image area adjoining the target image area. The control unit 11 can determine whether the position of the tip has reached the image forming position using a known method.

When it is determined that the position of the leading edge of the image area located after the target non-image area selected in ACT140 has reached the image forming position (ACT250, YES), the control unit 11 performs ACT260 and ACT270 in parallel. ACT260 and ACT270 may be performed in a predetermined order.

In ACT260, the control unit 11 controls the second conveyance unit 165 to set the second conveyance speed to the second conveyance unit 165 as the conveyance speed of the ink ribbon, thereby raising the conveyance speed of the ink ribbon to the second conveyance speed (ACT260). In FIG. 6, the process of ACT260 is indicated as "ribbon conveyance speed increased".

In ACT270, the control unit 11 sets the first conveyance speed to the first conveyance unit 164 as the conveyance speed of the print medium, thereby raising the conveyance speed of the print medium to the first conveyance speed (ACT270). In FIG. 6, the process of ACT270 is indicated as "medium conveyance speed increased".

After ACT150 through ACT270 are performed, the control unit 11 transitions to ACT140 to select the next target non-image area. When there is no unselected non-image area as the target non-image area in ACT140, the control unit 11 ends the loop of ACT140 through ACT270 and waits until the conveyance of the print medium is completed (ACT280). The control unit 11 can determine whether to end the conveyance of the print medium using any known method. For example, the control unit 11 determines that the conveyance of the print medium is ended when the print medium is discharged to a discharge tray (not shown) included in the image forming apparatus 1. On the other hand, for example, when the print medium is not discharged to the discharge tray, the control unit 11 determines that the conveyance of the print medium is not ended.

When it is determined that the conveyance of the print medium is ended (ACT280, YES), the control unit 11 ends the conveyance of the print medium started in ACT130 (ACT290), and ends the process of the flow chart shown in FIG. 6.

As described above, the image forming apparatus 1 performs the ink ribbon waste suppression process. Specifically, when the position of the leading end in the conveyance direction of the non-image area passes through the third position, the image forming apparatus 1 reduces the conveyance speed of the print medium by the first conveyance unit 164 to a third conveyance speed that is slower than the first conveyance speed, and reduces the conveyance speed of the ink ribbon by the second conveyance unit 165 to a fourth conveyance speed that is slower than the second conveyance speed. After the conveyance speed of the print medium by the first conveyance unit 164 is reduced to the third conveyance speed, the image forming apparatus 1 causes the moving unit 166 to move the position of the head 161 from the first position to the second position in the non-image area. Accordingly, the image forming apparatus 1 can more reliably suppress the use efficiency of the ink ribbon from decreasing.

The control unit 11 described above may be configured to stop the conveyance of the ink ribbon by the second conveyance unit 165 and the conveyance of the print medium by the first conveyance unit 164 so that the time SC and the time SD coincide with each other in ACT160. In this instance, the control unit 11 omits ACT190 and performs ACT200 in parallel with ACT180. In addition, the control unit 11 stops the conveyance of the print medium by the first conveyance unit 164 in ACT240 without increasing the conveyance speed of the ink ribbon by the second conveyance unit 165 in ACT230. Even in this case, the image forming apparatus 1 can more reliably prevent the use efficiency of the ink ribbon from decreasing.

The items described above may be combined in any way.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

A program for performing the functions of the image forming apparatus 1 described above may be recorded in a computer-readable recording medium, and the program may be read and executed by a computer system. The term "computer system" as used herein includes hardware such as an operating system (OS) and peripheral devices. A "computer-readable recording medium" refers to a portable medium such as a flexible disk, a magneto-optical disk, or a ROM, a compact disk (CD)-ROM, or a storage device such as a hard disk built in a computer system. A "computer-readable recording medium" includes a medium that holds a program for a certain period of time, such as a RAM in a computer system that serves as a server or client when a program is transmitted via a network such as the Internet or a communication line such as a telephone line.

The above-described program may be transmitted from a computer system in which the program is stored in a storage device or the like to another computer system via a transmission medium or by a transmission wave in a transmission medium. A "transmission medium" for transmitting a program refers to a medium having a function of transmitting information such as a network (communication network) such as the Internet or a communication line such as a telephone line.

The above-described program may be for realizing a part of the above-described functions. The above-described program may be a so-called difference file (difference program) that can realize the above-described function in combination with a program already recorded in a computer system.

What is claimed is:

1. An image forming apparatus comprising:

a head configured to transfer ink from an ink ribbon to a print medium;

a roller for pressing the print medium against the head; and a controller configured to control a conveyance speed of the print medium, a conveyance speed of the ink ribbon, and a distance between the head and the roller, wherein the controller is configured to:

upon receipt of print data, determine, along a conveyance direction of the print medium, one or more image areas in which an image is formed on the print medium and one or more non-image areas in which no image is formed on the print medium, at the beginning of printing, control the distance between the head and the roller such that the head and the roller contact each other, and set the conveyance speed of the print medium to a first value and the conveyance speed of the ink ribbon to a second value, before a first boundary between a first image area and a first non-image area that follows the first image area reaches a print position at which the head and the roller contact each other, set the conveyance speed of the print medium to a third value and the conveyance speed of the ink ribbon to a fourth value, the third value being lower than the first value and the fourth value being lower than the second value, and when the first boundary reaches the print position, control the distance between the head and the roller such that the head and the roller are separated from each other.

2. The image forming apparatus according to claim 1, wherein the controller is configured to, after the first boundary has passed the print position, set the conveyance speed of the ink ribbon to zero.

3. The image forming apparatus according to claim 2, wherein the controller is configured to, after the first boundary has passed the print position, set the conveyance speed of the print medium to a fifth value that is higher than the first value.

4. The image forming apparatus according to claim 3, wherein the controller is configured to, before a second boundary between the first non-image area and a second image area that follows the first non-image area passes the print position, set the conveyance speed of the print medium to the third value and the conveyance speed of the ink ribbon to the fourth value.

5. The image forming apparatus according to claim 4, wherein the controller is configured to, after the second boundary has passed the print position, set the conveyance speed of the print medium to the first value and the conveyance speed of the ink ribbon to the second value.

6. The image forming apparatus according to claim 1, wherein the controller is configured to determine to set the conveyance speed of the print medium to the third value and the conveyance speed of the ink ribbon to the fourth value when a length of the first non-image area in the conveyance direction is greater than a threshold.

7. The image forming apparatus according to claim 1, further comprising:

a moving mechanism configured to move the head, wherein the controller is configured to control the moving mechanism to change the distance between the head and the roller.

8. The image forming apparatus according to claim 1, wherein the image forming apparatus is a thermal printer.

9. A method performed by an image forming apparatus that includes:

a head configured to transfer ink from an ink ribbon to a print medium, and a roller for pressing the print medium against the head, the method comprising:

upon receipt of print data, determining, along a conveyance direction of the print medium, one or more image areas in which an image is formed on the print medium and one or more non-image areas in which no image is formed on the print medium;

at the beginning of printing, controlling a distance between the head and the roller such that the head and the roller contact each other, and setting a conveyance speed of the print medium to a first value and a conveyance speed of the ink ribbon to a second value;

before a first boundary between a first image area and a first non-image area that follows the first image area reaches a print position at which the head and the roller contact each other, setting the conveyance speed of the print medium to a third value and the conveyance speed of the ink ribbon to a fourth value, the third value being lower than the first value and the fourth value being lower than the second value; and when the first boundary reaches the print position, controlling the distance between the head and the roller such that the head and the roller are separated from each other.

10. The method according to claim 9, further comprising:

after the first boundary has passed the print position, setting the conveyance speed of the ink ribbon to zero.

11. The method according to claim 10, further comprising:

after the first boundary has passed the print position, setting the conveyance speed of the print medium to a fifth value that is higher than the first value.

12. The method according to claim 11, further comprising:

before a second boundary between the first non-image area and a second image area that follows the first non-image area passes the print position, setting the conveyance speed of the print medium to the third value and the conveyance speed of the ink ribbon to the fourth value.

13. The method according to claim 12, further comprising:

after the second boundary has passed the print position, setting the conveyance speed of the print medium to the first value and the conveyance speed of the ink ribbon to the second value.

14. The method according to claim 9, further comprising:

determining to set the conveyance speed of the print medium to the third value and the conveyance speed of the ink ribbon to the fourth value when a length of the first non-image area in the conveyance direction is greater than a threshold.

15. The method according to claim 9, wherein the image forming apparatus includes a moving mechanism configured to move the head, and the method further comprises:

controlling the moving mechanism to change the distance between the head and the roller.

16. The method according to claim 9, wherein the image forming apparatus is a thermal printer.

17. A non-transitory computer readable medium storing a program causing a computer to execute a method of forming an image on a print medium using an ink ribbon, the method comprising:

upon receipt of print data, determining, along a conveyance direction of the print medium, one or more image areas in which an image is formed on the print medium and one or more non-image areas in which no image is formed on the print medium;

at the beginning of printing, controlling a distance between a head and a roller for pressing the print medium against the head such that the head and the roller contact each other, and setting a conveyance speed of the print medium to a first value and a conveyance speed of the ink ribbon to a second value;

before a first boundary between a first image area and a first non-image area that follows the first image area reaches a print position at which the head and the roller contact each other, setting the conveyance speed of the print medium to a third value and the conveyance speed of the ink ribbon to a fourth value, the third value being lower than the first value and the fourth value being lower than the second value; and when the first boundary reaches the print position, controlling the distance between the head and the roller such that the head and the roller are separated from each other.

18. The computer readable medium according to claim 17, wherein the method further comprises:

after the first boundary has passed the print position, setting the conveyance speed of the ink ribbon to zero.

19. The computer readable medium according to claim 18, wherein the method further comprises:

after the first boundary has passed the print position, setting the conveyance speed of the print medium to a fifth value that is higher than the first value.

20. The computer readable medium according to claim 19, wherein the method further comprises:

before a second boundary between the first non-image area and a second image area that follows the first non-image area passes the print position, setting the conveyance speed of the print medium to the third value and the conveyance speed of the ink ribbon to the fourth value.

* * * * *